United States Patent [19]

Smith

[11] Patent Number: 4,813,704
[45] Date of Patent: Mar. 21, 1989

[54] DUAL STRUT WHEEL SUSPENSION

[75] Inventor: Robert H. Smith, Troy, Mich.

[73] Assignee: Chrysler Motors Corporation, Highland Park, Mich.

[21] Appl. No.: 208,607

[22] Filed: Jun. 20, 1988

[51] Int. Cl.⁴ ............................................. B60G 3/00
[52] U.S. Cl. .................................. 280/692; 280/788; 280/697; 280/710; 280/719
[58] Field of Search ............... 280/788, 692, 701, 710, 280/719, 697

[56] References Cited

U.S. PATENT DOCUMENTS

| | | | |
|---|---|---|---|
| 2,018,653 | 10/1935 | Best | 280/692 |
| 2,083,457 | 6/1937 | Ledwinka | 280/719 |
| 2,644,696 | 7/1953 | Bill | 280/43.18 |
| 2,678,830 | 5/1954 | Ciagan et al. | 280/710 |
| 2,819,769 | 1/1958 | Moorehead | 180/140 |
| 2,873,124 | 2/1959 | Walker | 280/710 |
| 2,983,328 | 5/1961 | Ewert | 280/701 |
| 3,768,828 | 10/1973 | Klein | 280/702 |
| 4,377,298 | 3/1983 | Finn et al. | 280/663 |
| 4,422,666 | 12/1983 | Proctor | 280/719 |
| 4,458,918 | 7/1984 | Rumpel | 280/719 |
| 4,557,500 | 12/1985 | Collard et al. | 280/669 |
| 4,582,160 | 4/1986 | Weismann et al. | 180/250 |
| 4,635,957 | 1/1987 | Merkle | 280/663 |
| 4,688,778 | 8/1987 | Woltron | 267/148 |

FOREIGN PATENT DOCUMENTS

| | | | |
|---|---|---|---|
| 142626 | 3/1935 | Austria | 280/692 |
| 1959045 | 5/1971 | Fed. Rep. of Germany | 280/701 |
| 672942 | 1/1930 | France | 280/692 |
| 442174 | 11/1948 | Italy | 280/701 |

Primary Examiner—Kenneth R. Rice
Attorney, Agent, or Firm—Edward P. Barthel

[57] ABSTRACT

A front wheel suspension for a front wheel drive vehicle incorporating dual shock absorber struts arranged in tandem. Each fore and aft strut has its cylindrical casing lower end pivotally connected to an associated one of a lower control arm bifurcated leg portion for rotational movement about a longitudinal extending strut lower pivot axis. Each strut casing upper end is pivotally connected by a pintle pin for rotating movement about a longitudinal extending strut upper pivot axis to the inboard end of a swingable upper control arm. The lower control arm leg portions have their inboard ends pivotally connected to a sub-frame engine cradle for rotational movement about an axis parallel to the strut upper and lower pivot axes. An intermediate portion of a drive half shaft assembly is positioned in the space between the fore and aft struts. A transverse leaf spring has each outboard end supported on an associated lower control arm. Intermediate portions of the leaf spring are supported on the sub-frame cradle such that the front wheel suspension is mounted solely on the sub-frame cradle.

6 Claims, 4 Drawing Sheets

DUAL STRUT WHEEL SUSPENSION

BACKGROUND OF THE INVENTION

This invention relates to vehicle wheel suspensions and more particularly to a dual strut wheel leaf spring suspension for a motor vehicle front steerable wheel.

The U.S. Pat. No. 4,377,298 issued Mar. 22, 1983 to Finn et al. discloses a single vertical telescopic strut and transverse lower control arm type suspension enabling a lower overall height within the suspension assembly. In the Finn suspension a hydraulic damper strut member is arranged generally upright relative to the vehicle sprung mass for attachment at its upper end in a wheel well area of the superstructure. The strut lower end is interconnected to a swingable lower control arm at a location on the control arm substantially inboard of its outer end such that the shock stroke during vehicle wheel jounce and rebound is reduced enabling a reduction in the strut length. Finn also discloses a yoke configuration at the lower end of the strut sleeve allowing a drive axle to extend from the vehicle power plant sprung mass for passage between the pair of yoke legs to a live spindle of the front wheel knuckle.

The U.S. Pat. Nos. 2,644,696 issued Jul, 7, 1953 to Bill; 2,678,830 issued May 18, 1954 to Cigan et al.; 2,819,769 issued Jan. 14, 1958 to Moorehead; 2,873,124 issued Feb. 10, 1959 to Walker; 3,768,828 issued Oct. 30, 1973 to Klein; and 4,635,957 issued Jan. 13, 1987 to Merkle broadly disclose a pair of shocks, struts, or springs on either side of a vehicle axle or the like.

SUMMARY OF THE PRESENT INVENTION

It is therefore an object of the present invention to provide a dual strut type suspension for a front wheel drive vehicle which may be packaged in a reduced space near and above the road wheels enabling a lower overall height within the vehicle suspension assembly making possible lower hoodlines.

It is another object of the present invention to provide an improved dual strut type suspension as set forth above wherein all the suspension components are mounted outboard of the vehicle chassis side rail on an isolated engine cradle sub-frame structure.

The invention incorporates a pair of jointly acting side-by-side parallel disposed telescopic cylinder-piston type hydraulic damper shock absorber struts. Each of the strut cylinders is pivotally attached by, means of a pivot connection ear adjacent its upper end, to a longitudinally extending pintle pin. An upper swingable control arm has a reduced lateral extent by virtue of its inboard end journally supported on the pintle pin intermediate the strut cylinder pivot connection ears. The upper control arm outboard end is connected, via an upper floating ball joint, to the upper end of a wheel support knuckle. A lower A-type swingable control arm has its each of its two inwardly directed bifurcated legs journally mounted in spaced brackets, fixed to an isolated sub-frame engine cradle structure, for pivoting movement about a longitudinally extending axis.

The lower control arm outer end supports a lower ball joint connected to the wheel support knuckle. Each shock absorber strut piston rod upper end is connected to a free standing structure or shock mounting tower fixed on the engine cradle sub-frame rail element by means of an isolation mount. The lower control arm captures the free outboard end of a transverse flexible leaf spring intermediate its bifurcated legs. The suspension arrangement enables the dual struts to accept therebetween a half-shaft drive axle, extending outwardly from the vehicle transmission.

BRIEF DESCRIPTION OF THE DRAWINGS

These and other objects, features and advantages of the present invention will be apparent from the following specification and from the accompanying drawings wherein.

DESCRIPTION OF THE PREFERRED EMBODIMENT

Figure 1:
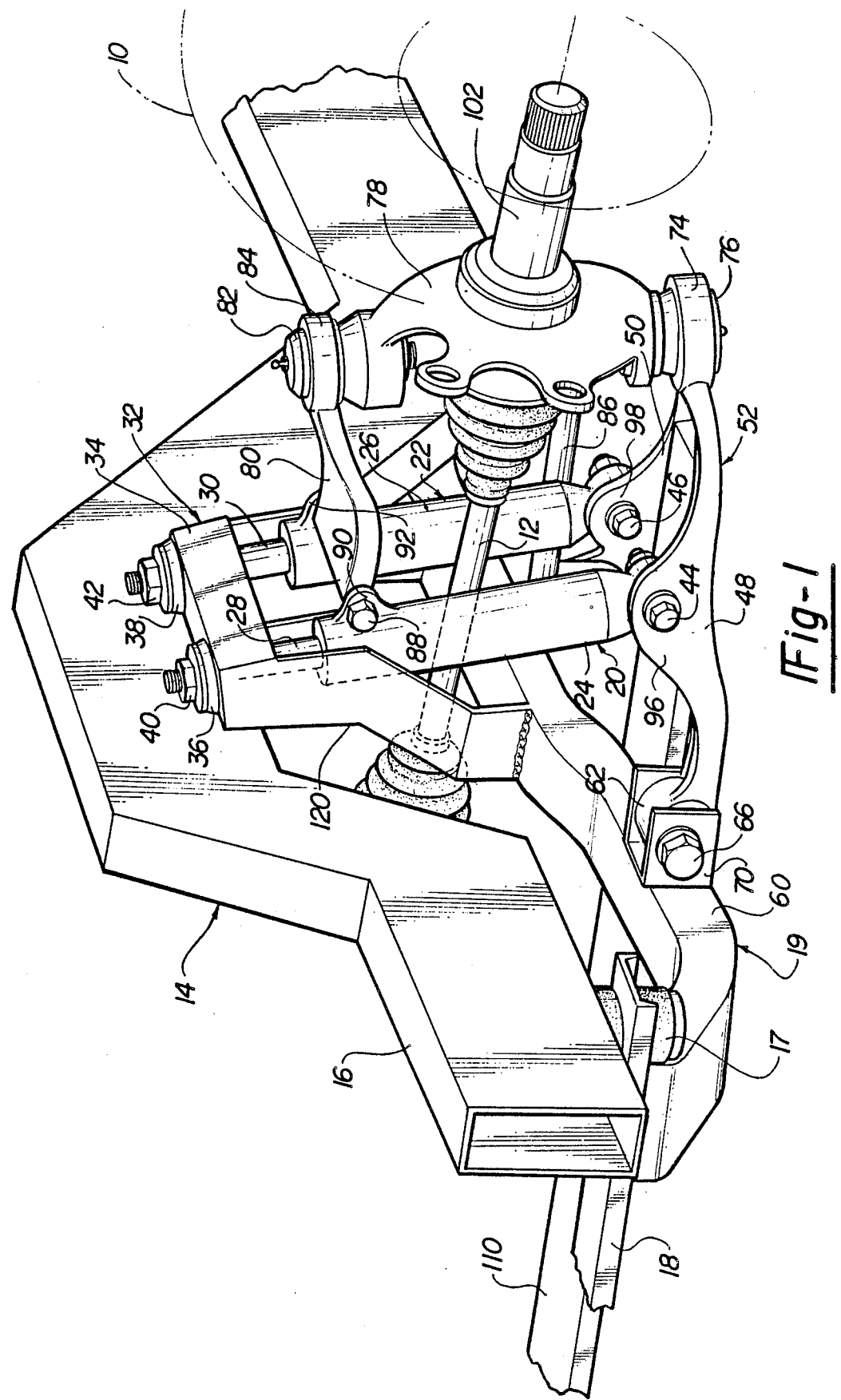
FIG. 1 is a fragmentary perspective view showing a drive wheel embodiment of a vehicle wheel suspension in accordance with the invention.

Referring particularly now to FIG. 1 of the drawings, there is illustrated the front portion of an automotive vehicle chassis and front suspension, in accordance with this invention for the steerable left hand front wheel as partially indicated in phantom at 10. The road wheel 10 is adapted for connection via a drive half shaft assembly 12 to a front drive vehicle transaxle such as shown and described in U.S. Pat. No. 4,582,160 issued Apr. 15, 1986 to Weismann et al., for example. The Weismann et al. transaxle, the disclosure of which is incorporated by reference herein, is located in the front compartment of the vehicle body or sprung mass.

In the front drive vehicle shown, the vehicle sprung mass chassis body may comprise a vehicle body frame structure, generally indicated at 14, including a preassembled combination of stamped sheet steel welded box sections with a portion of the left hand side rail being shown at 16. The side rail 16 is connected by a resilient isolation mount 17 to a cross member, partially shown at 18, of an isolated engine cradle or sub-frame structure generally indicated at 19. The cradle 19 supports the vehicle engine and transaxle (not shown) and is bolted to the remainder of the vehicle frame sections or members via a plurality of resilient isolation mounts indicated by sub-frame isolation mounts 17 in FIGS. 1 and 5.

The vehicle front wheel suspension in accordance with this invention includes a pair of longitudinally spaced fore and aft identical vertical shock absorber suspension struts generally indicated at 20 and 22, respectively, in FIG. 1. Each of the side-by-side fore and aft shock absorber struts 20 and 22 comprises an outer support casing or cylinder 24 and 26, respectively, and an associated telescoping piston rod 28 and 30. It is understood that the shock absorber struts are conventional and may be a double-tube hydraulic fluid design or a single-tube design using gas pressure and a floating piston to adjust the internal volume of the working chamber to suit the piston rod's position.

Each of the piston rods 28, 30 has it upper end suitably anchored to a chassis frame member in the form of a sheet metal structure which in the disclosed form is a free standing mounting tower, generally indicated at 32 in FIG. 1. The tower mounting structure 32 includes an upper inverted trough-shaped portion 34 to which the upper ends of the piston rods 28 and 30 are resiliently anchored by conventional rubber isolation couplings indicated at 36 and 38, respectively. Hex nuts 40 and 42 are threaded on the upper ends of their associated piston rods 28 and 30 for retaining the struts to the tower mounting structure.

Figure 3:
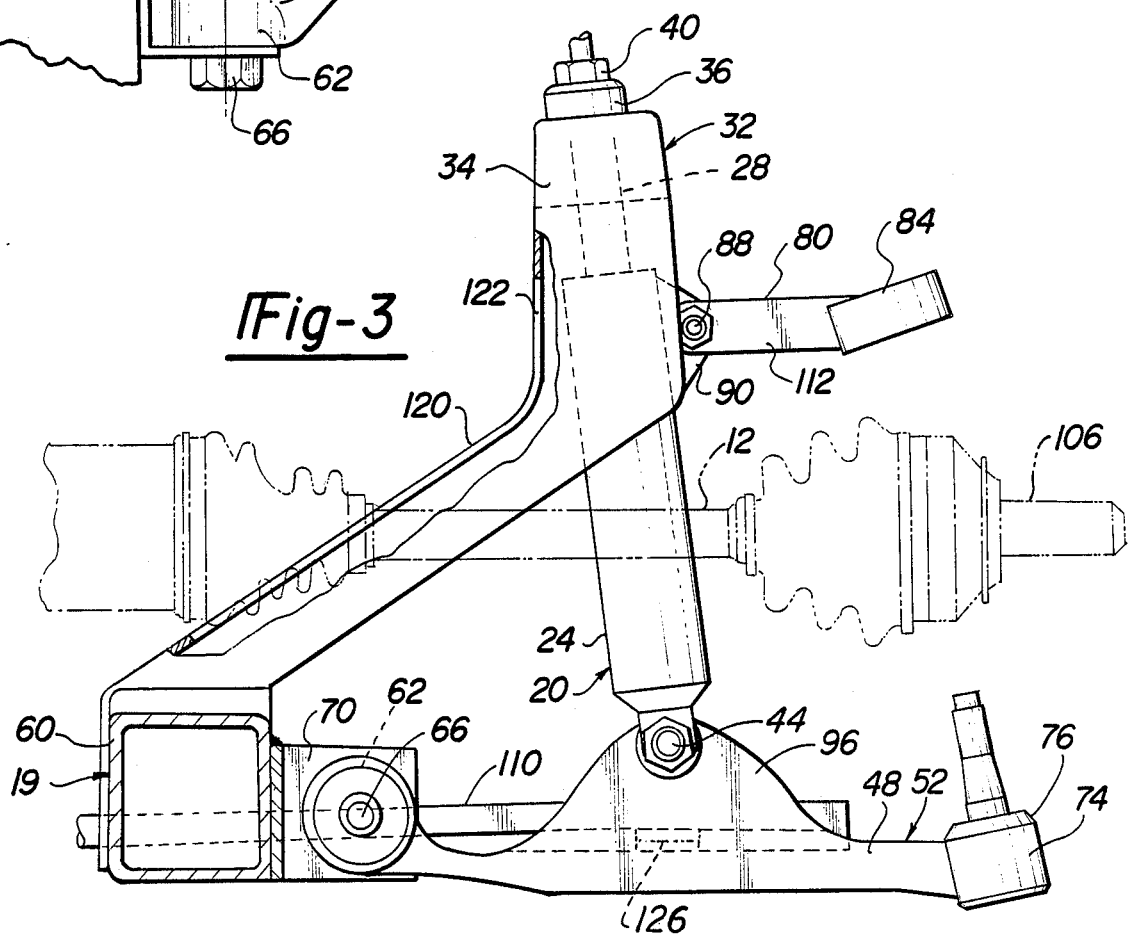
FIG. 3 is a fragmentary front elevational view, partly in section, showing the wheel suspension of FIG. 1.

As seen in FIGS. 1 and 3 the lower end of each shock cylinder 24 and 26 is pivotally mounted on pins 44 and 46, respectively, to front and rear bifurcated legs 48 and 50 of a lower A-shaped control arm, generally indicated at 52. Each of the pins 44 and 46, have their axes aligned on a common longitudinally extending strut lower pivot axis shown at 53 in FIG. 4. In the preferred embodiment, bushings 54 and 56 are integrally formed on the lower end of the shock cylinders 24 and 26, respectively. The bushings 54 and 56 have conventional internal elastomeric grommet members (not shown) to provide dampening insulation against noise.

Figure 2:
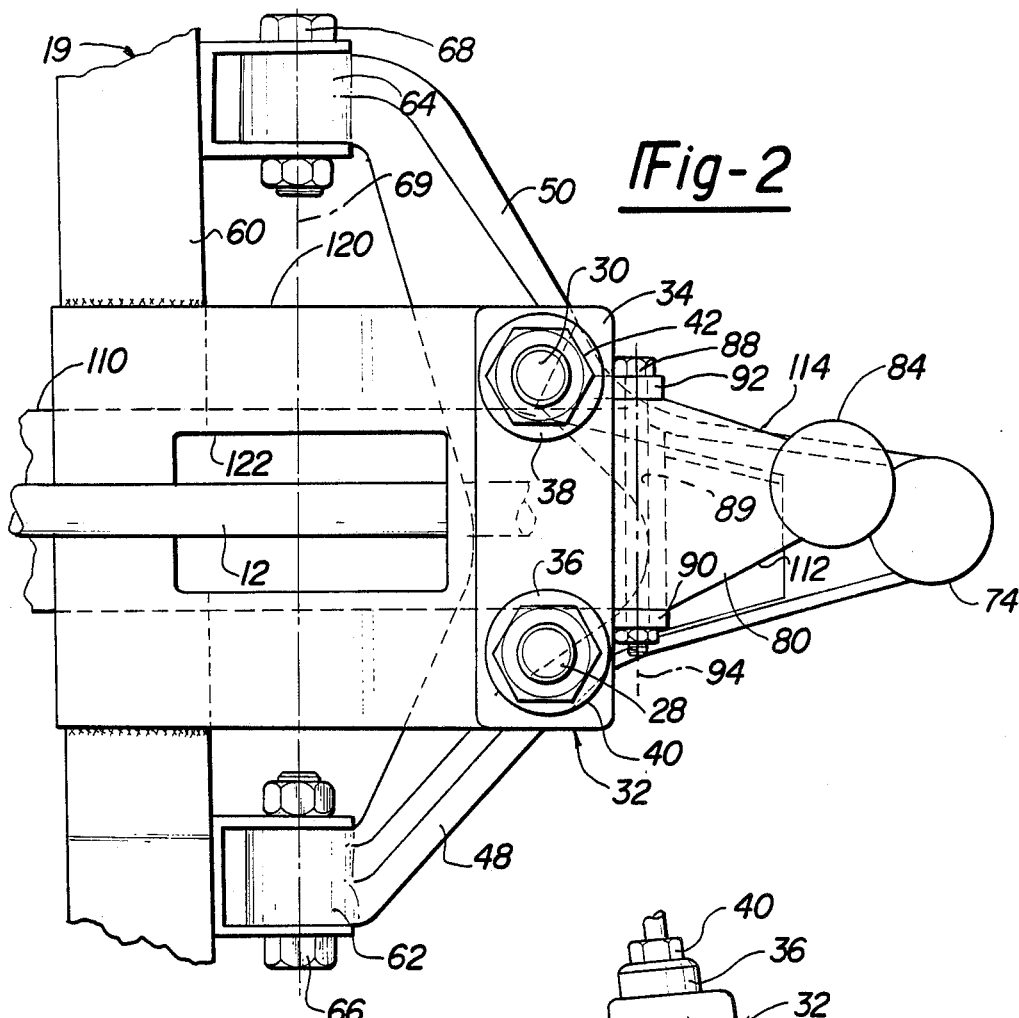
FIG. 2 is a fragmentary top elevational plan view of the wheel suspension of FIG. 1.

As best seen in FIGS. 1, 2 and 3 the inboard ends of the bifurcated legs 48 and 50 are each pivotally connected to the sub-frame cradle structure longitudinal side beam 60 by bushings 62 and 64, respectively. The bushings 62 and 64 include pivot pin bolts 66 and 68, respectively, arranged in such a manner that the lower control arm 52 can be moved pivotally around a common lower control arm pivot axis 69 parallel to the strut lower pivot axis 53 and to the longitudinal axis of the vehicle frame. In the disclosed embodiment fore and aft U-shaped bushing mounting brackets 70 and 72 are provided to receive their associated pivot pins 66 and 68 therethrough. The brackets 70 and 72 are fixedly secured as by welding to the engine cradle sub-frame longitudinal member 60.

FIG. 1 shows the outboard end of the lower control arm 52 having a single bush supporting journal collar 74 fixed at the outboard juncture of its legs 48 and 50. The journal collar 74 receives a lower ball stud pivot 76 connected to the lower end of a steering knuckle 78 (FIG. 1). The steering knuckle 78 has its upper end is connected to an upper control arm 80 by means of an upper ball stud pivot 82. The upper control arm 80 has an outboard collar 84 journally supporting the upper ball stud pivot 82. A suitable steering tie rod, indicated at 86 in FIG. 1, connects with a steering arm (not shown) via a ball stud pivot (not shown) in a conventional manner.

Figure 4:
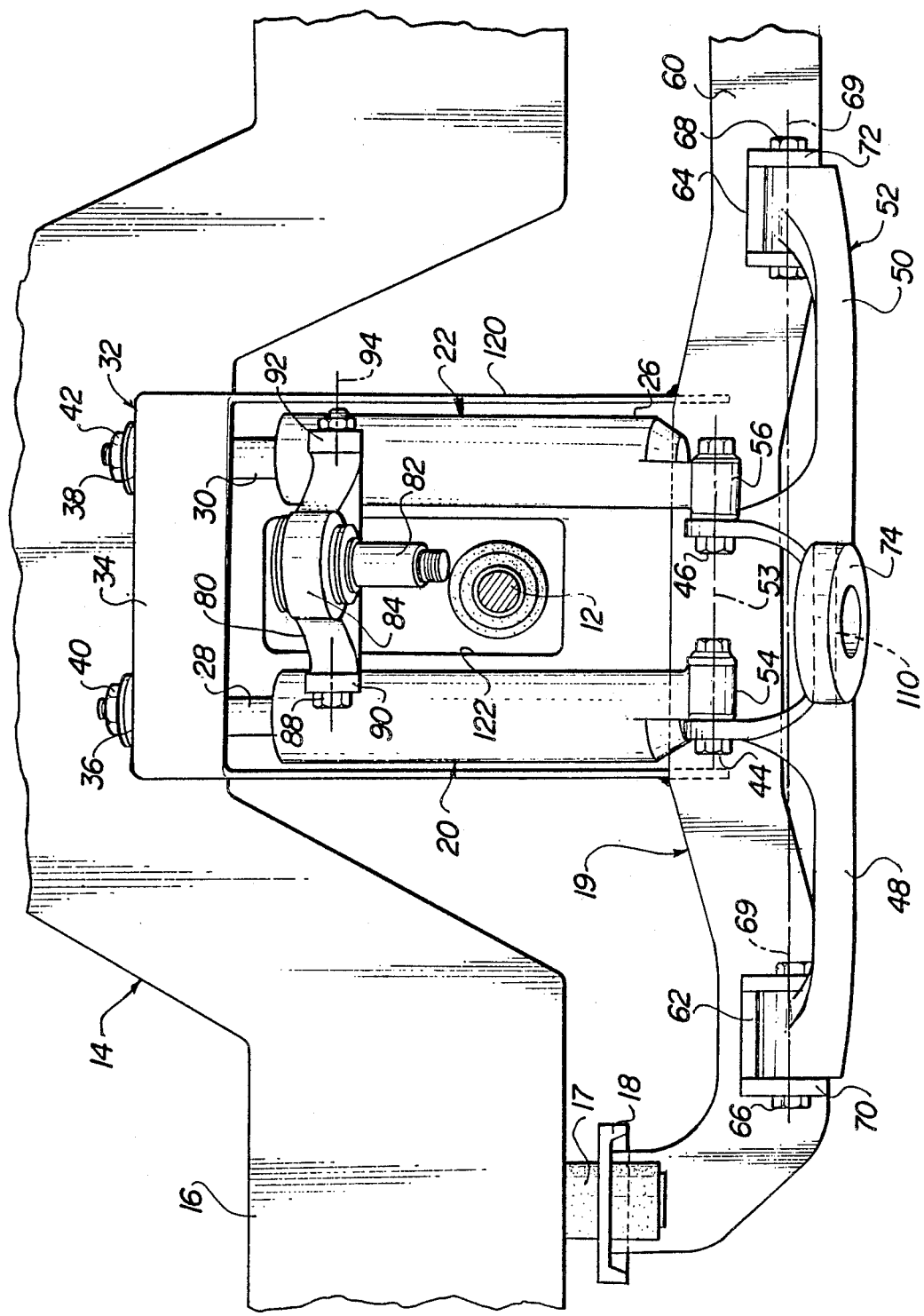
FIG. 4 is a fragmentary side elevational view of the wheel suspension taken along the line 4—4 of FIG. 3.

The upper control arm 80 has its inboard end pivotally attached via a bolt pintle pin 88, extending through upper control arm bore 89, to the upper ends of each of the shock cylinders 24 and 26. Each of the strut cylinders 24 and 26 has its upper end formed with a pivot connection ear 90 and 92, respectively, longitudinally spaced to receive the inboard end of the upper control arm 80 therebetween. As seen in FIG. 4, the pintle pin 88 is aligned on a longitudinally extending strut upper pivot axis 94 oriented substantially parallel to the strut lower pivot axis 53. It will be noted that each bifurcated leg 48 and 50 of the lower control arm 52 is formed with an apertured lobe 96 and 98, respectively. Each of the lobes 96 and 98 is adapted to journally receive therethrough their associated longitudinally aligned pivot pins 44 and 46, respectively.

The tire and wheel assembly, indicated in phantom lines 10 in FIG. 1, is mounted upon a live or driven spindle element 102 of knuckle 78 in a known manner. As seen in FIG. 1 the drive shaft assembly outboard end 106 (FIG. 3) is drivingly connected to the spindle 102. As seen in FIG. 4 the drive axle 12 extends through the space provided between the shock absorber cylinders 24 and 26 with its principal axis substantially equidistant from the principal axis of each cylinder.

As illustrated in FIG. 1 a transverse elastic beam or leaf spring 110, preferably made of reinforced composite synthetic resin plastic material, is initially bowed in a convex upward manner prior to assembly on the vehicle. Reference may be had to U.S. Pat. No. 4,688,778 issued Aug. 25, 1987 to H. Woltron showing a plastic leaf spring suitable for use with the present invention the disclosure of which is incorporated by reference herein.

The leaf spring 110 extends laterally with its one free end held in engagement with the lower control arm 52 adjacent the outboard juncture of its bifurcated legs 48 and 50. Intermediate portions of the leaf spring 110 are secured, as by bonding, to the vehicle sub-frame or engine cradle side beam 60 by pads or blocks of elastomer 124 shown in FIG. 5. The outboard ends of the leaf spring are bonded to the lower control arms 52 by elastomer pads indicated at 126 in FIG. 3 for the left hand control arm 52. Examples of a prior art transverse leaf spring structure and mounting arrangements are shown in U.S. Pat. Nos. 4,458,918; issued July 10, 1984, to Rumpel and 4,557,500; issued Dec. 10, 1985 to Collard et al. the disclosures of which are incorporated by reference herein.

The leaf spring 110 is adapted to bear the vehicle sprung mass upon the unsprung mass including both left and right wheel assemblies with only the left wheel being shown at 10. Thus, the transverse leaf spring 110 replaces conventional coiled suspension springs which normally surround shock absorber struts of conventional front wheel drive vehicles using MacPherson strut suspension systems. As a result a reduction in the height of the suspension components is achieved as compared to such MacPherson strut suspension systems. By virtue of the dual shock absorbing struts 20 and 22 interacting with a common transverse leaf spring 110 the disclosed arrangement achieves a compact dual strut front wheel drive suspension the components of which can be preassembled with the engine cradle 19 shown in FIG. 5.

With reference to FIGS. 1 and 2 the upper control arm 80 comprises a single, substantially flat member having transverse fore 112 and aft 114 edges which taper inwardly as they extend from the inboard end to the outboard end of the upper control arm.

Figure 5:
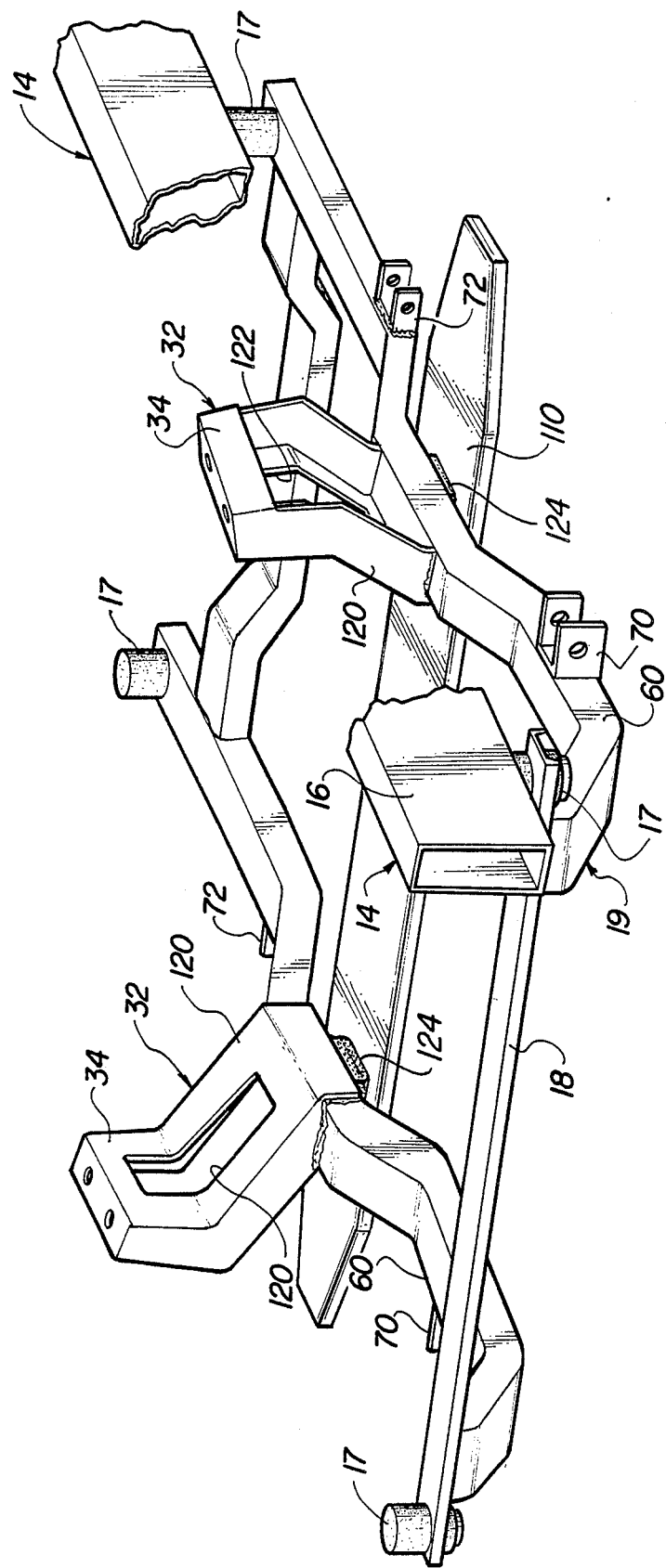
FIG. 5 is a perspective detail view of the engine cradle sub-frame structure of the present invention.

As best seen in FIG. 5 each of the towers 32 are supported on their associated upwardly bowed portion of the cradle side beams 60 by tower base portion 120 being suitably affixed thereto as by welding. It will be noted in FIGS. 2, 4, and 5 that each tower base 120 is formed with a rectangular aperture 122 allowing the passage of its associated drive half shaft assembly 12 therethrough.

Although only one embodiment of the present invention has been illustrated and described, modifications and variations will readily come to mind of a person skilled in the art which modifications and variations do not fall outside the scope of the invention as defined hereinafter.

What is claimed is:

1. A front wheel suspension for the sprung mass of a vehicle having a steerable driving front road wheel with said sprung mass including a body frame and a sub-frame engine cradle supported thereon, said road wheel drivingly connected to a transversely extending drive half shaft assembly, said front suspension comprising:

- an A-type lower control arm extending transversely of the vehicle and swingly mounted to said cradle, said lower control arm defined by front and rear bifurcated leg portions joined at their outboard ends, each said leg portion having its inboard end pivotally attached to said cradle for rotational movement about a longitudinally extending lower control arm pivot axis;
- a pair of parallel fore and aft longitudinally spaced telescopic shock absorber struts operatively connected between a support structure on said cradle and said lower control arm, said struts arranged with their principal axes in a generally upright manner such that said drive half shaft assembly extends through the space between said struts;
- each said strut comprising a cylindrical casing having its lower end pivotally attached to an associated one of said lower control arm bifurcated leg portions intermediate its ends for rotational movement about a longitudinally extending strut lower pivot axis, each said strut having a piston rod extending exteriorly of its associated casing upper end and connected to said cradle structure;
- an upper control arm extending transversely of the vehicle, pivot connection means mounting the inboard end of said upper control arm to pintle pin means adjacent the upper ends of each of said strut cylindrical casing, said pintle pin means adapted to pivot said upper control arm about a longitudinally extending strut upper pivot axis parallel to said strut lower pivot axis;
- a wheel support member including a drive spindle rotatable therein connected to said drive half shaft assembly, said wheel support member having upper and lower ball stud pivots affixed thereto, said upper ball stud means operatively connected to the outboard ends of said upper arm and said lower ball stud means operatively connected to said joined outboard ends of said lower control arm leg portions, whereby said wheel support member is adapted for steered rotation relative to said upper and lower control arms; and
- a primary suspension spring comprising an elastic beam extending transversely of said vehicle body frame having its principal axis of symmetry located intermediate said pair of fore and aft struts, said elastic beam having its outboard end supported on said lower control arm and arranged to bear loads transferred between said cradle and said wheel support member whereby said front wheel suspension is mounted outboard of the vehicle frame on said sub-frame engine cradle.

2. The front wheel suspension as set forth in claim 1, wherein said drive half shaft assembly extending through said space between said struts is vertically oriented intermediate said strut upper and lower pivot axes.

3. The front wheel suspension as set forth in claim 1, wherein said elastic beam in the form of a one piece leaf spring formed of a composite synthetic resin material.

4. The front wheel suspension as set forth in claim 1, wherein said sub-frame engine cradle supported by isolation mounts on said vehicle frame.

5. The front wheel suspension as set forth in claim 1, wherein cradle strut support structure in the form of a free standing strut mounting tower having an aperture allowing passage of said drive half shaft assembly therethrough.

6. The front wheel suspension as set forth in claim 1, wherein said pivot means in the form of a pivot connection ear affixed to the upper end of each said strut cylindrical casing receiving a pintle pin.

* * * * *